United States Patent [19]

Evans et al.

[11] 4,307,385
[45] Dec. 22, 1981

[54] NOISE MONITORING APPARATUS

[75] Inventors: Sue A. Evans, 218 E. Streetsboro St., Hudson, Ohio 44236; Clarence L. Rogers, Hartville, Ohio

[73] Assignee: Sue Ann Evans, Hudson, Ohio

[21] Appl. No.: 962,650

[22] Filed: Nov. 22, 1978

[51] Int. Cl.³ ............................................. G08B 21/00
[52] U.S. Cl. ................................... 340/540; 73/697; 340/573
[58] Field of Search ............... 340/540, 573, 515, 635; 179/1 MN; 73/647, 646

[56] References Cited

U.S. PATENT DOCUMENTS

| | | | |
|---|---|---|---|
| 3,098,121 | 7/1963 | Wadsworth | 179/1 MN |
| 3,306,991 | 2/1967 | Wood | 179/107 R |
| 3,697,973 | 10/1972 | Stevens et al. | 340/540 |
| 3,786,519 | 1/1974 | Aileo | 2/6 |
| 3,802,535 | 4/1974 | Peake et al. | 73/647 |
| 3,818,860 | 6/1974 | Miller | 179/1 P |
| 3,848,471 | 11/1974 | Hamburg et al. | 73/647 |
| 3,868,857 | 3/1975 | Maddox et al. | 179/1 MN |
| 3,884,086 | 5/1975 | Steger | 179/1 MN |
| 3,968,697 | 7/1976 | Mutzinger | 73/647 |
| 3,991,628 | 11/1976 | Narita | 73/647 |
| 4,064,362 | 12/1977 | Williams | 179/1 P |
| 4,070,630 | 1/1978 | Hepworth et al. | 307/269 |
| 4,100,810 | 7/1978 | Sima, Jr. et al. | 73/647 |

FOREIGN PATENT DOCUMENTS 1349408   4/1974   United Kingdom .................. 73/647

OTHER PUBLICATIONS

Savich, Miron, "Noise Monitor Hat", *Sound and Vibration*, Jan., 1976, p. 8.

Primary Examiner—Glen R. Swann, III
Attorney, Agent, or Firm—Fisher, Gerhardt, Crampton & Groh

[57] ABSTRACT

An apparatus for monitoring the noise which impinges a human ear and for generating a signal representing the noise level accumulated over a period of time. Typically, the apparatus can be located in a hearing protector worn by a worker in a noisy environment. A microphone generates a signal having a magnitude representing the detected noise level of the ear which signal is processed by an absolute value circuit and a root mean square circuit to generate a signal having a magnitude proportional to the logarithm of the detected noise level. This logarithmic signal is converted by a voltage to frequency converter and a counter accumulates a count total proportional to the noise level over a period of time. The apparatus includes visual and aural alarms to indicate a maximum allowed noise level and dosage. The apparatus can also be inserted into a storage unit for reading the data, calibrating the noise monitor circuitry and recharging the batteries in the apparatus.

15 Claims, 6 Drawing Figures

NOISE MONITORING APPARATUS

BACKGROUND OF THE INVENTION

The present invention generally relates to noise monitoring apparatus and in particular to an apparatus for detecting maximum noise levels and dosages and for accumulating data relating to noise dosages.

There is substantial concern for the hearing of workers exposed to noisy environments. Most of the work in this area has been done on devices for protecting the hearing such as ear plugs and external ear muffs. Such devices operate by attenuating the intensity of the noise transmitted through them. In general, the higher frequency components are attenuated more than the lower frequency components. However, in order to protect against extremely high noise intensities, these devices require bulky and expensive construction.

One method of reducing the size of the hearing protector is to include an electronic noise limiter. In one prior art apparatus, all sounds must pass through an electro-acoustical transmission system. This system includes means for limiting the maximum excursion of the amplitude of the noise signals to a predetermined safe level.

One problem with such noise limiting devices is that there is no record of the total noise exposure of the worker during his shift. If the worker is subject to noise dosage standards such as noise intensity over predetermined time periods, the work time must be limited to the standard period for the maximum noise limit of the limiting means. Depending upon the actual noise levels the worker has received, the worker may be required to stop work before he receives the maximum allowable dosage. One solution to this problem is in the form of a noise monitoring circuit mounted on a "hard" hat. A microphone and a battery pack is located on one side of the hat and a noise dosimeter is located on the other side of the hat. The dosimeter includes storage for noise levels over 115 dBA and a memory cell built to OSHA (Occupational Safety and Health Administration) criteria.

SUMMARY OF THE INVENTION

There are several problems not solved by the prior art devices. A worker who has been exposed either to a noise which exceeds a maximum standard or to a dosage in excess of the maximum dosage should leave the noisy environment. None of the prior art devices have means for signalling either the worker or his supervisor that these limits have been exceeded. Another problem is identifying areas which produce noise in excess of the standards such that corrective measures can be taken to decrease the noise level thereby increasing the working time of each worker. While the prior art devices can record excessive noise levels and dosages, they do not indicate when the level or dosage was exceeded such that the location of the worker at that time could be ascertained. Such information is especially important where the worker moves from place to place to perform his job.

The noise monitor apparatus according to the present invention solves these problems of the prior art devices. Typically, the noise monitor circuitry can be located in an ear muff hearing protector. The noise monitor includes a microphone positioned to detect the noise which impinges the wearer's ear. The noise signal generated by the microphone is applied to an absolute value circuit and then to a root mean square circuit to generate an output signal having a magnitude proportional to the dBA level of the detected noise. This output signal is compared with a reference signal to generate a visual and/or audio alarm signal if the detected noise level exceeds a maximum standard. Thus, the worker and his supervisor are immediately warned when and where the noise level standard is exceeded.

The output signal is also applied to a voltage to frequency converter to generate a signal having a frequency proportional to the dBA level of the detected noise. The cycles of the converter output signal are counted to accumulate a count total representing the dosage received by the worker. If the count total exceeds a predetermined maximum dosage, the visual and/or audio alarm signal can be generated.

When the worker has finished his shift, the noise monitor apparatus can be placed in a storage unit. The storage unit generates clock signals for reading the dosage count total stored in the noise monitor circuitry, generates calibration signals to check the calibration of the noise monitor circuitry and generates power to recharge the battery power supply for the noise monitor circuitry. The storage unit can include a computer for storing the dosage data and calibration data by employee number and date, a display for the dosage data and calibration data and a printer for generating a printed record of the data.

It is an object of the present invention to protect a worker from harmful high intensity noise.

It is another object of the present invention to generate an alarm signal when a maximum noise level or noise dosage is exceeded.

It is a further object of the present invention to more accurately detect the intensity of noise which impinges the human ear.

DESCRIPTION OF THE PREFERRED EMBODIMENT

Figure 1:
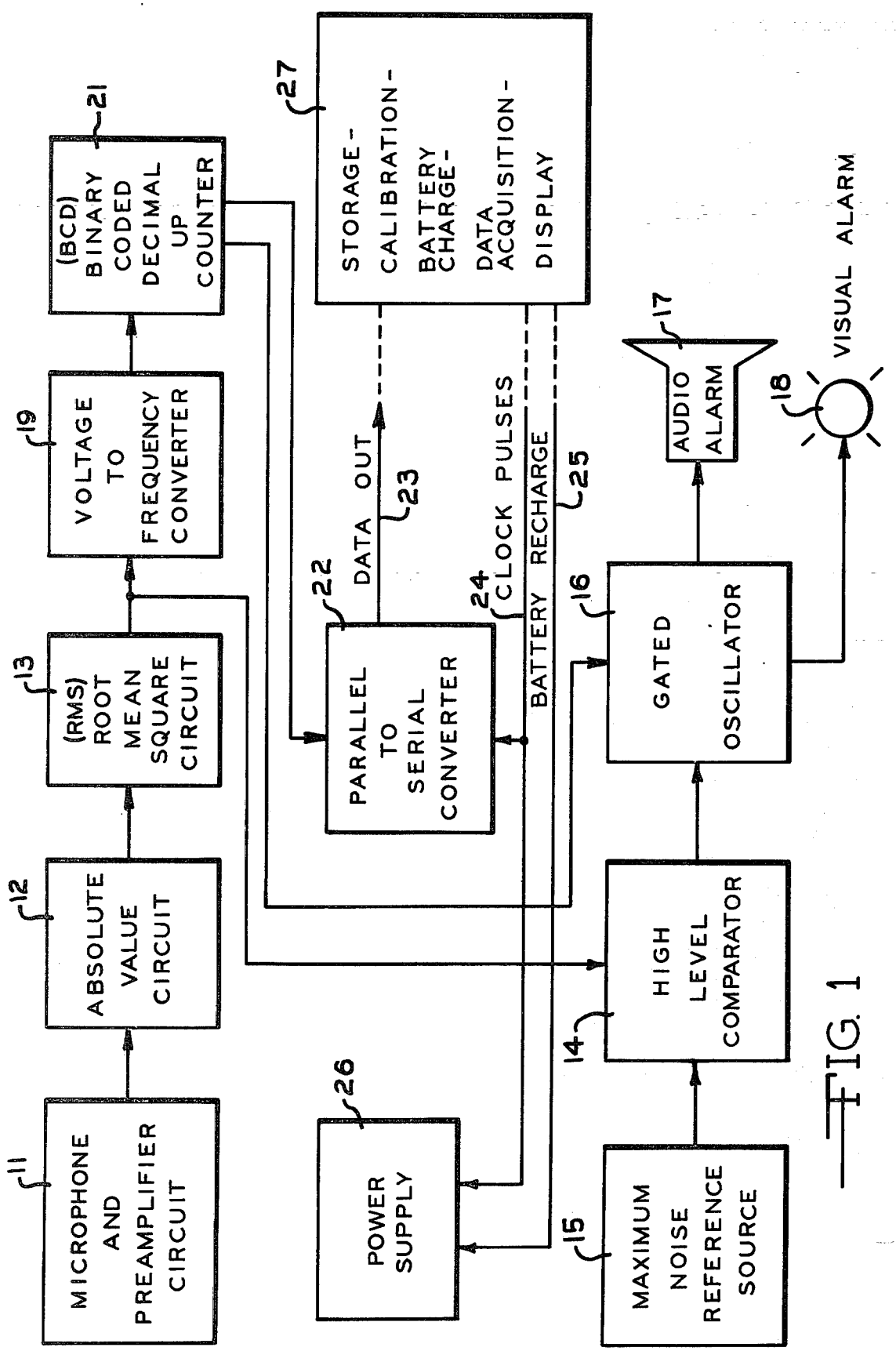
FIG. 1 is a block diagram of a hearing protector and noise monitor apparatus and a storage unit noise monitoring system according to the present invention.

There is shown in FIG. 1 a block diagram of a hearing protector and noise monitor apparatus according to the present invention. The noise monitor includes noise detection, dosage storage, and alarm circuits which are worn by a worker during the time he is exposed to a noisy environment. All of the circuits typically can be mounted in one or both of a pair of ear muff-type ear protectors or the detector can be mounted in an ear plug and the other circuitry can be mounted on a headband or helmet.

A microphone and preamplifier circuit 11 includes a microphone (not shown) located to receive the noise which impinges the ear of the wearer of the hearing protector. The signal generated by the microphone is amplified to generate a signal having a magnitude in a workable range for the expected noise levels. For example, the preamplifier (not shown) can generate the signal at five millivolts representing ninety dBA at one kilohertz. The term dBA represents decibels adjusted with a reference level of ninety decibels below one milliwatt (−90 dBm).

The signal generated by the microphone and preamplifier circuit is a random frequency and magnitude sinusoidal wave form. The sinusoidal wave form is rectified by an absolute value circuit 12. Then, the effective magnitude of the signal is determined by a root-mean-square (RMS) circuit 13 which doubles the magnitude of its output signal with every five dB increase in the noise level detected by the microphone. This relationship reflects a governmental standard for exposure intensity/time wherein for each five dB increase in noise intensity, the allowable exposure time must be cut in half. The output signal from the RMS circuit 13 is one input to a high level comparator 14. A maximum noise reference source 15 generates a signal having a magnitude representing a predetermined maximum sound level, for example one hundred fifteen dBA. The comparator 14 generates an output signal to turn on a gated oscillator circuit 16 when the magnitude of the RMS circuit output signal exceeds the magnitude of the reference signal. The gated oscillator 16 can actuate an indicating device. The indicating device can be an audio alarm 17 and a visual alarm 18. The audio alarm 17 can be a buzzer which is heard by the worker indicating to him that he must stop work since he has been exposed to a maximum permissible noise level. The visual alarm 18 can be external to the noise protector to indicate to a foreman or a supervisor that the worker has been exposed to a maximum permissible noise level.

The output signal from the RMS circuit 13 is also an input to a voltage to frequency converter 19. The converter 19 generates an output signal having a frequency proportional to the magnitude of the input signal. However, the input circuitry (not shown) to the converter 19 can be set to pass only signals above a predetermined minimum safe level, for example, ninety dBA. A count of the cycles of the output signal from the converter 19 is accumulated in a binary coded decimal (BCD) up counter 21. If the accumulated count total exceeds a predetermined number representing a maximum dosage, the BCD counter 21 generates an output signal to turn on the gated oscillator 16 to actuate the audio alarm 17 and the visual alarm 18.

The accumulated count total is an output, in parallel form, from the BCD counter 21 to a parallel to serial converter 22. The converter generates the count total in serial form on a data line 23 in response to a series of clock pulses received on a clock line 24. The clock line 24 and a recharge line 25 are connected to a power supply 26 for the previously described circuitry.

The data line 23, the clock line 24 and the recharge line 25 can be connected to a three socket connector (not shown). This connector can mate with a pin connector (not shown) mounted in a storage unit 27. The storage unit can include circuitry for calibration, battery charge, data acquisition, and display as will be discussed below. When the hearing protector is placed into its storage space, the storage unit generates clock pulses on the line 24. The converter 22 responds to the clock pulses to generate the count total at the data line 23. When the count total has been read out, a charging voltage is applied to the lines 24 and 25 to recharge the power supply 26.

In summary, the hearing protector and noise monitor according to the present invention detects noise at the wearer's ear. A voltage having a magnitude proportional to the noise level is generated and applied to an absolute value circuit and an RMS circuit to generate an output signal which doubles in magnitude for every five dB increase in the noise level. This output signal is utilized to trigger an audio alarm and a visual alarm when a predetermined maximum noise level is exceeded. The portions of this output signal which exceed a predetermined safe noise level are applied to a voltage to frequency converter to generate a cyclic signal, the cycles of which are counted by a BCD counter to represent the noise dosage received by the wearer. If the count total exceeds a predetermined maximum dosage, the alarms are actuated. At the end of the work period, the hearing protector is placed in the storage unit, the accumulated count total is read, the power supply is recharged and the calibration of the noise monitor circuitry is checked.

Figure 2:
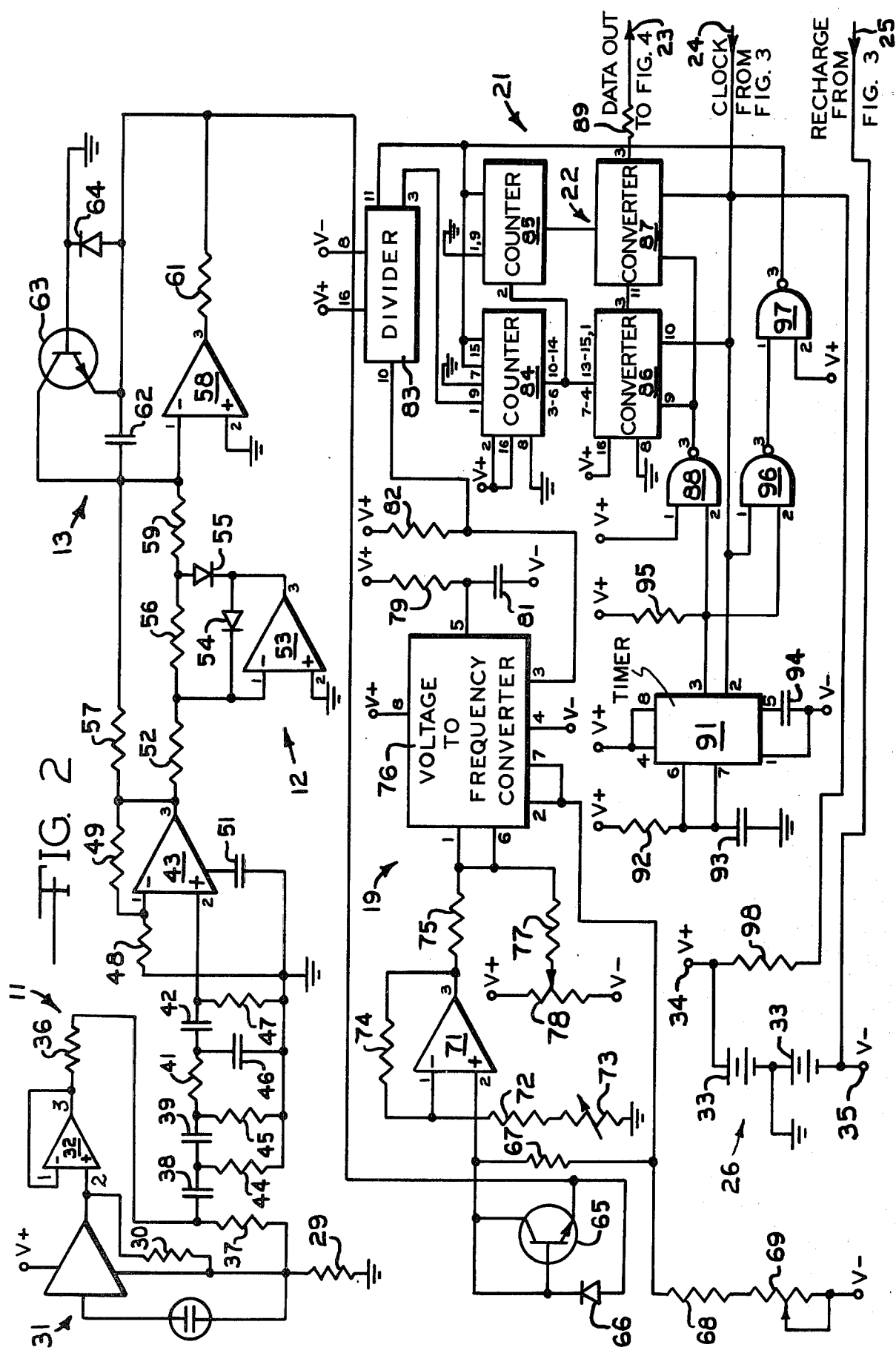
FIG. 2 is a schematic diagram of the noise monitor circuitry of the apparatus of FIG. 1.

There is shown in FIG. 2 a schematic diagram of the noise monitor circuitry of the present invention excluding the alarm circuitry. The microphone and preamplifier circuit 11 includes a miniature microphone and buffer 31. The microphone is connected between an input of the buffer and a first power input terminal of the buffer. The buffer has a second power input terminal connected to the positive terminal of the power supply and an output connected to a non-inverting input 32-2 of an amplifier 32 and connected through a resistor 30 to the first power input terminal. The first power input terminal is connected to the circuit ground potential through a resistor 29. The power supply 26 typically can be two pair of batteries 33, 1.2 volts each, connected in series between a positive potential terminal 34 and a negative potential terminal 35. The junction between the batteries is connected to the system ground potential. In the interests of clarity, the various circuit connections to the terminals 34 and 35 are not shown but are designed V+ and V− respectively.

An output 32-3 of the amplifier 32 is connected to an inverting input 32-1 and to one end of a resistor 36 having its other end connected to the first power input terminal of the buffer through a resistor 37. The resistor 36 is also connected in series with a capacitor 38, a capacitor 39, a resistor 41 and a capacitor 42 to a non-inverting input 43-2 of an amplifier 43. A resistor 44 is connected between the junction of the capacitors 38 and 39 and the system ground potential. A resistor 45 is connected between the junction of the capacitor 39 and the resistor 41 and the circuit ground potential. A capacitor 46 is connected between the junction of the resistor 41 and the capacitor 42 and the circuit ground potential. A resistor 47 is connected between the input 43-2 and the circuit ground potential. The above-described resistors and capacitors form an impedance matching network to match the output impedance of the microphone and buffer 31 and the amplifier 32 with the input impedance of the amplifier 43.

Since not all noise signals are equally annoying to the listener, the received noise is weighted. At low noise levels, the human ear is considerably more sensitive to midrange frequencies than to bass and, to a lesser extent, treble frequencies. The above-described resistor-capacitor network weights the microphone output signal to take into account this characteristic of the human ear.

Figure 5:
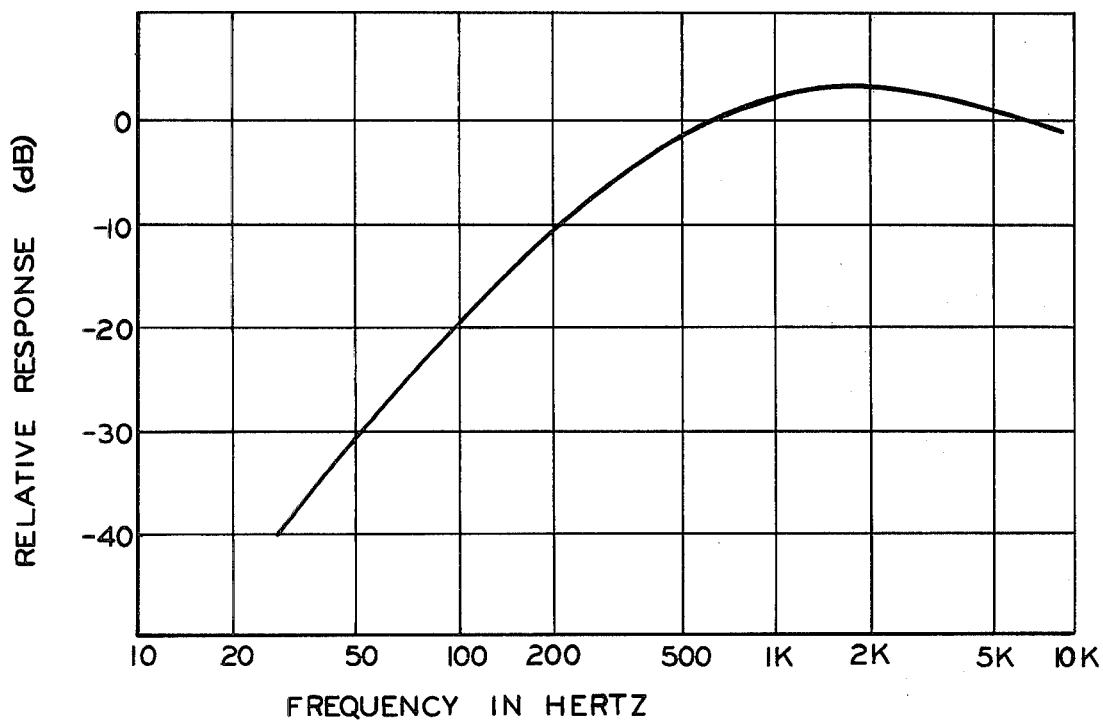
FIG. 5 is a representation of the ANSI "A" weighting curve.

There is shown in FIG. 5 the ANSI (American National Standards Institute) "A" weighting curve. Not only does the resistor-capacitor network of FIG. 2 impedance match, but it also provides "A" weighting to the signal.

The amplifier 43 has a pair of power inputs (not shown) connected to the V+ and V− terminals of the power supply 26. As will be discussed below, the amplifier also has a frequency compensation input having a frequency compensation capacitor connected thereto. The other three amplifiers in FIG. 2 also have power inputs and a frequency compensation input which are connected in a similar manner to those of the amplifier 43 but will not be shown in the interest of simplifying the schematic.

An inverting input 43-1 of the amplifier 43 is connected to the circuit ground potential through a resistor 48. A feedback resistor 49 is connected between the input 43-1 and an output 43-3 of the amplifier 43. A capacitor 51 is connected between a compensation input 43-4 and the circuit ground potential to frequency compensate the amplifier. The value of the resistor 49 typically is selected such that the amplifier output signal is five millivolts at one kilohertz for a ninety dB noise level.

The output signal from the amplifier 43 is applied to the absolute value circuit 12. The output 43-3 is connected through a resistor 52 to an inverting input 53-1 of an amplifier 53. The amplifier 53 has a non-inverting input 53-2 connected to the circuit ground potential, and an output 53-3 connected to an anode of a diode 54 and to a cathode of a diode 55. The diode 54 has a cathode connected to the inverting input 53-1 and the diode 55 has an anode connected to the inverting input 53-1 through a resistor 56.

The input to the absolute value circuit 12 is a random frequency sinusoidal wave form which is to be full-wave rectified. The portions of the sinusoidal wave form which are of positive polarity with respect to the circuit ground potential are inverted by the amplifier 53 to appear at the junction of the diode 55 and the resistor 56. The portions of the sinusoidal wave form which are negative pass through the diodes 54 and 55 to appear at the same junction.

It is desired to generate a signal which is directly proportional to the dB level of the noise detected by the microphone such that a single count total can be generated to represent the accumulated noise over a period of time. Therefore, the output signal from the absolute value circuit 12 is applied to the RMS circuit 13 to generate a signal having a magnitude which is the logarithm of the root mean square of the input signal magnitude. This signal is then scaled to generate an output signal which changes 0.2 volt for each five dB change in the noise level.

The amplifier output 43-3 is connected through a resistor 57 to an inverting input 58-1 of an amplifier 58. The junction of the resistor 56 and the diode 55 is connected through a resistor 59 to the input 58-1. The amplifier 58 has a non-inverting input 58-2 connected to the circuit ground potential and an output 58-3 connected to one end of a resistor 61. The resistor 61 has its other end connected to the input 58-1 through a capacitor 62. An NPN transistor 63 has a collector connected to the input 58-1 and an emitter connected to the junction of the resistor 61 and the capacitor 62. The transistor 63 also has a base connected to the circuit ground potential and to a cathode of a diode 64. The diode 64 has an anode connected to the junction between the resistor 61 and the capacitor 62.

The RMS (root mean square) output signal is equal to the square root of the average value of the input voltage squared or $$V_{out}\ (RMS) = \sqrt{\overline{V_{in}^2}}\ .$$

The RMS output signal can be restated as equal to the antilogarithm of one half of the average value of two times the logarithm of the input signal or V out (RMS=log$^{-1}$ ($\frac{1}{2}$ $\overline{(2\ \log\ V_{in})}$)). Then the logarithm of V out (RMS) is taken to generate the desired linear signal. In terms of circuitry, the input signal would be applied to a series of circuits comprising a logarithm circuit, a scaling and averaging circuit, an antilogarithm circuit and a logarithm circuit. Since the output signal from a series connected antilogarithm circuit-logarithm circuit will equal the input signal, these two circuits can be eliminated. Thus, the amplifier 58, the transistor 63 and the diode 64 form a logarithm circuit and the amplifier 58 and the capacitor 62 form an averaging circuit for the absolute value input signal.

The junction of the resistor 61 and the capacitor 62 is connected to an emitter of an NPN transistor 65. The transistor 65 has a collector connected to a base. The emitter is connected to an anode of a diode 66 and the base is connected to a cathode of the diode 66. The collector of the transistor 65 is connected to the V− negative potential terminal of the power supply 26 through a series connection of a resistor 67, a resistor 68 and a potentiometer 69. The potentiometer 69 is utilized to adjust the gain of the transistor 65 which amplifies the signal from the logarithm and averaging circuits.

The collector of the transistor 65 is also connected to a non-inverting input 71-2 of an amplifier 71. The amplifier 71 has an inverting input 71-1 connected to the system ground potential through a resistor 72 and a variable resistor 73 connected in series. The amplifier 71 has an output 71-3 connected to the input 71-1 through a resistor 74. The output 71-3 is connected through a resistor 75 to a current output 76-1 and a threshold input 76-6 of a voltage to frequency converter 76. The output 76-1 and the input 76-6 are also connected through a resistor 77 to a tap of a potentiometer 78. The ends of the potentiometer 78 are connected to the V+ and V− terminals of the power supply 26. The junction of the resistors 67 and 68 is connected to a reference current input 76-2 and a comparator input 76-7. A pair of power supply inputs 76-8 and 76-4 are connected to the V+ and V− terminals respectively of the power supply 26. An R-C (resistor-capacitor network) input 76-5 is connected to the V+ power supply terminal through a resistor 79 and to the V− power supply terminal through a capacitor 81. A frequency output 76-3 is connected to the V+ power supply terminal through a resistor 82 and to an input 83-10 of a fourteen stage, ripple-carry, binary counter/divider.

The transistor 65 and the amplifier 71 circuits generate a signal having a magnitude which is proportional to the dB level of the detected noise. Typically, this signal represents 0.2 volts per five dB of noise. The converter 76 generates a pulse train which alternates between V+ and V− at a frequency proportional to the magnitude of the signal at the input 76-6.

The divider 83 has a pair of power supply inputs 83-16 and 83-8 connected to the V+ and V− power supply terminals respectively. An output 83-3, the fourteenth stage, is connected to a clock input 84-1 of a BCD up counter 84 and a reset input 83-11 is connected to a pair of reset inputs 84-7 and 84-15. An enable input 84-2 is connected to the V+ power supply terminal and a pair of power supply inputs 84-16 and 84-8 are connected to the V+ and V− terminals respectively. The binary signals representing one, two, four and eight are generated at a plurality of outputs 84-3, 84-4, 84-5 and 84-6 (not shown separately) respectively as the binary coded decimal one's digit. The output 84-6 is connected to an enable input 84-10 (not shown separately) for the accumulation of counts representing the ten's digit. The binary signals representing one, two, four and eight are generated at a plurality of outputs 84-11, 84-12, 84-13, and 84-14 (not shown separately) respectively as the binary coded decimal ten's digit. The output 84-14 is connected to an enable input 85-2 of a BCD up counter 85. A clock input 84-9 is connected to the circuit ground potential. The other inputs and outputs of the counter 85 are similar to those of the counter 84 and will not be described. However, a clock input 85-1 is connected to the circuit ground potential. The output signals generated by the counter 85 represent the binary coded decimal hundred's digit and thousand's digit. The counters 84 and 85 are the counter 21 of FIG. 1.

The outputs of 84-3, 84-4, 84-5 and 84-6 of the counter 84 are connected to a plurality of inputs 86-7, 86-6, 85-5 and 86-4 of an eight stage, parallel to serial register 86. The outputs 84-11, 84-12, 84-13 and 84-14 are connected to a plurality of inputs 86-13, 86-14, 86-15 and 86-1 respectively. A pair of power supply inputs 86-16 and 86-8 are connected to the V+ and V− power supply terminals respectively. An output 86-3 is connected to a serial input 87-11 of an eight stage, parallel to serial register 87. A parallel/serial control input 86-9 is connected to an output 88-3 of a NAND 88 and a clock input 86-10 is connected to the clock line 24. The register 87 has an output 87-3 connected through a resistor 89 to the data line 23. The inputs and outputs of the register 87 are similar to those of the register 86 and will not be described. The register 86 receives the one's and ten's signals and the register 87 receives the hundred's and thousand's signals. The registers 86 and 87 are the converter 22 of FIG. 1.

A timer 91 has a reset input 91-4 and a power supply input 91-8 connected to the V+ power supply terminal. A threshold input 91-6 and a discharge input 91-7 are connected to the V+ power supply terminal through a resistor 92 and to the circuit ground potential through a capacitor 93. A power supply input 91-1 is connected to the V− power supply terminal and a control voltage input 91-5 is connected to the V− power supply terminal through a capacitor 94. An output 91-3 is connected to the V+ power supply terminal through a resistor 95 and to an input 88-2 of the NAND 88. An input 88-1 is connected to the V+ power supply terminal such that the NAND 88 functions as an inverter for the signal generated at the output 91-3. The output 91-3 is also connected to an input 96-2 of a NAND 96. A trigger input 91-2 of the timer 91 is connected to an input 96-1 of the NAND 96, to the input 86-10 of the register 86 and to the similar input of the register 87. An output 96-3 of the NAND 96 is connected to an input 97-1 of a NAND 97. The NAND 97 has an input 97-2 connected to the V+ power supply terminal to function as an inverter for the output signal from the NAND 96. An output 97-3 is connected to the reset inputs 84-7 and 84-15 of the counter 84 and to the similar inputs of the counter 85. The clock line 24 is connected to the V+ power supply terminal 34 through a resistor 98 and the recharge line 25 is connected to the V− power supply terminal 35.

The pulse train generated by the converter 76 is divided by a factor of two to the fourteenth power (16,384) by the divider 83. The one's stage of the counter 84 is enabled at the enable input 84-2 to count the output pulses from the divider 83. The binary eight output 84-6 is connected to the ten's stage enable input 84-10 to enable the ten's stage to count the tenth pulse in each group of ten pulses counted by the one's stage. The counter 85 has its hundred's stage enabled from the binary eight output 84-1 and its thousand's stage enabled from the binary eight output 85-6.

The outputs from the counter 84 and 85 are connected to the inputs to the parallel to serial converters 86 and 87. The timer 91 is connected as a monostable multivibrator and the output 91-3 is normally at V− such that the NAND 88 generates a logic "1" signal at the parallel/serial control inputs 86-9 and 87-9 to load the counter data into the converters. The clock line 24 is held at V+ through the resistor 98 to disable the timer 91. When the hearing protector and noise monitor is plugged into the storage unit, a series of sixteen logic "0" clock pulses are generated on the clock line 24. The clock pulse triggers the monostable multivibrator at the trigger input 91-2 to generate a logic "1" pulse at the output 91-3 for approximately 0.1 second. The "1" pulse from the output 91-3 generates a "0" pulse from the NAND 88 to switch the converters to serial operation. Thus, the sixteen clock pulses clock the accumulated data through the converters 86 and 87 and onto the data line 23 to the storage unit. The logic "1" pulse from the timer output 91-3 and the V+ on the clock line 23 generate a logic "0" from the NAND 96 which is inverted by the NAND 97 to generate a "1" to reset the counters 84 and 85 and the divider 83. The converters do not respond to the resetting of the counters to zero since the converters are in the serial mode. At the end of the sixteen clock pulses, the V+ potential is applied to the clock line 23 and the V− potential is applied to the recharge line 25 by the storage unit to recharge the batteries 33. The storage unit can also generate a standard noise level to the microphone 31 and then read out the count total to check the calibration of the noise monitor circuitry.

| FIG. 2 TABLE OF ELEMENTS | |
|---|---|
| 29 | 8.2 K ohms |
| 30 | 47 K ohms |
| 31 | BL1785 microphone with buffer, Knowles Electronics |
| 33 | B50T Eveready |
| 36,37 | 600 ohms |
| 38,39 | 0.33 microfarad |
| 41,61,89 | 10 K ohms |
| 42 | 0.047 microfarad |
| 32,43,53,58,71 | LM 308 operational amplifier |
| 44,45 | 1.8 K ohms |
| 46 | 2200 picofarads |
| 47,48,52,56,57 67,74,75 | 100 K ohms |
| 49,77,92 | 1M ohms |
| 51 | 100 picofarads |
| 54,55,64,66 | 1N914 diode |
| 59 | 50 K ohms |

-continued

| FIG. 2 TABLE OF ELEMENTS | |
|---|---|
| 62,93 | 0.1 microfarads |
| 63,65 | LM114H |
| 68 | 12 K ohms |
| 69 | 5 K ohms, potentiometer |
| 72 | 1 K ohms |
| 73 | 1 K ohms, variable |
| 76 | LM 331 voltage to frequency converter |
| 78,95 | 100 K ohms, potentiometer |
| 79 | 6.8 K ohms |
| 81,94 | 0.01 microfarad |
| 82 | 22 K ohms |
| 83 | 4020 divider |
| 84,85 | 4518 counter |
| 86,87 | 4021 parallel to serial converter |
| 88,96,97 | 4011 NAND |
| 91 | LM 555 timer |
| 98 | 100 ohms |

Although the divider 83 has been shown as connected for division by 16,384, it can be connected to divide by two or any power of two from two to the fourth through two to the fourteenth. The divider value is selected along with the other scaling in the input circuit to generate a count total of 100.0 representing the maximum dosage. An output 85-11 (not shown) of the counter 85 will generate a "1" when the counter total reaches 100.0.

The "1" signal at the output 85-11 can be utilized to actuate the gated oscillator 16 of FIG. 1 to indicate that the maximum dosage has been reached. Referring to FIG. 1, the maximum noise reference source 15 can be a voltage divider, typically adjustable, for generating a reference voltage. The voltage divider output and the junction of the resistors 75 and 77 can be connected to the inputs of an LM308 operational amplifier. The output of the amplifier and the output 85-11 (not shown) of FIG. 2 can be OR'ed to gate the oscillator. The oscillator 16 can be an LM555 timer connected for astable multivibrator operation at one kilohertz and gated with the reset input connected to the output of the OR. The output of the timer can be connected to the input of the audio alarm through a five K ohm resistor. The audio alarm can be a model BK1600 receiver manufactured by Knowles Electronics. The output from the OR can also be utilized to disable the counters at the enable input 84-2 to preserve the count total at which the alarm was triggered.

Figure 3:
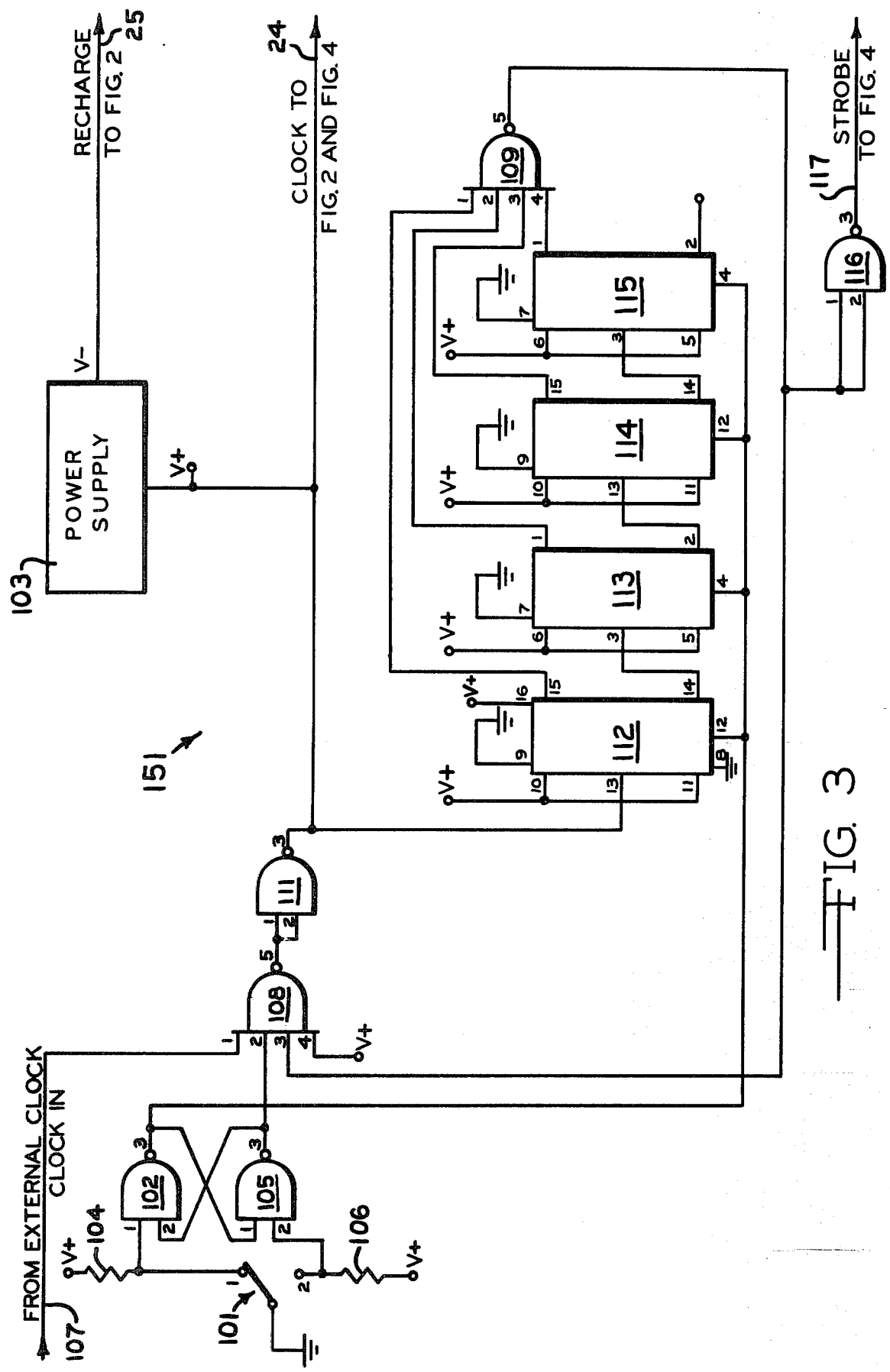
FIG. 3 is a schematic diagram of the clock pulse generating circuitry in the storage unit of FIG. 1.

There is shown in FIG. 3 a schematic diagram of the circuitry in the storage unit 27 for generating the sixteen clock pulses on the clock line 24. A switch 101 has an arm connected to the circuit ground potential and in contact with a terminal 101-1 which represents the unactuated position of the switch. The terminal 101-1 is connected to an input 102-1 of a NAND 102 and to the V+ potential of a storage unit power supply 103 through a resistor 104. The NAND 102 has an output 102-3 connected to an input 105-1 of a NAND 105 and an input 102-2 connected to an output 105-3 of the NAND 105. The NAND 105 has an input 105-2 connected to a terminal 101-2 of the switch 101 and to the V+ power supply potential through a resistor 106. The NAND's 102 and 105 form a NAND flip flop.

A clock line 107 is connected to an input 108-1 of a NAND 108 to receive clock pulses from an external clock (not shown). The NAND 108 has an input 108-2 connected to the output 105-3 of the NAND 105, an input 108-3 connected to an output 109-5 of a NAND 109, and an input 108-4 connected to the V+ power supply potential. The NAND 108 has an output 108-5 connected to a pair of inputs 111-1 and 111-2 of a NAND 111 which functions as an inverter. The NAND 111 has an output 111-3 connected to the clock line 24 and to a clock input 112-13 of a J-K flip flop 112. The clock line 24 is also connected to the V+ terminal of the power supply 103 and the recharge line 25 is connected to the V− terminal of the power supply 103.

The flip flop 112 has a J input 112-10 and a K input 112-11 connected to the V+ power supply terminal. A set input 112-9 is connected to the circuit ground potential and a reset input 112-12 is connected to the output 102-3 of the NAND 102. A non-inverting output 112-15 is connected to an input 109-1 of the NAND 109 and an inverting output 112-14 is connected to a clock input 113-3 of a J-K flip flop 113. The flip flop 113 has a J input 113-6, a K input 113-5, a set input 113-7, a reset input 113-4, a non-inverting output 113-1 and an inverting output 113-2. The flip flops 112 and 113 are typically formed in the same integrated circuit and share a pair of power supply inputs, 112-16 connected to the V+ terminal and 112-8 connected to the circuit ground potential. A pair of flip flops 114 and 115 are similarly connected such that the flip flops 112, 113, 114 and 115 are connected in series with the non-inverting outputs 112-15, 113-1, 114-15 and 115-1 connected to inputs 109-1, 109-2, 109-3 and 109-4 respectively. The output 109-5 is connected to a pair of inputs 116-1 and 116-2 of a NAND 16 which functions as an inverter. The NAND 116 has an output 116-3 connected to a strobe line 117.

When the switch 101 is in the position shown in FIG. 3, the NAND flip flop generates a "1" at the output 102-3 to reset the flip flops 112 through 115 and a "0" at the output 105-3 to disable the NAND 108. Thus, any clock pulse generated on the line 107 will not be passed by the NAND 108. When the hearing protector and noise monitor is inserted into the storage unit, the switch 101 is actuated and the switch arm is moved into contact with the terminal 101-2. Now the input 102-1 is at "1" and the input 105-2 is at "0" to generate a "0" at the output 102-3 and a "1" at the output 105-3. Since each of the J-K flip flop non-inverting outputs are at "0", the NAND 109 generates a "1" at the input 108-3. The NAND 108 is now enabled to invert the clock pulses on the line 107 which pulses are inverted again by the NAND 111.

The first "0" to "1" transition at the output 111-3 will clock the flip flop 112 to generate a "1" at the output 112-15 and a "0" at the output 112-14. The next "0" to "1" transition at the output 111-3 again clocks the flip flop 112 to change the outputs 112-15 and 112-14 to "0" and "1" respectively. This second change clocks the flip flop 113. Thus, each of the J-K flip flops devides the pulse train by two. After sixteen clock pulses have been generated, all of the inputs to the NAND 109 will be at "1" to generate a "0" at the output 109-5. The NAND 116 inverts the "0" to generate a "1" strobe pulse on the line 117. The "0" also disables the NAND 108 at the input 108-3 to prevent the passage of any more clock pulses.

In summary, the actuation of the switch 101 generates sixteen clock pulses on the clock line 24 and a strobe pulse on the line 117. The circuit disables itself after the sixteen pulses have been generated. When the hearing protector and noise monitor is withdrawn from the storage box, the switch 101 returns to the position shown to reset the NAND flip flop and the J-K flip flops.

| FIG. 3 TABLE OF ELEMENTS | |
| --- | --- |
| 102,105,111,116 | 4011 NAND |
| 104,106 | 100 K ohms |
| 108,109 | 4012 NAND |
| 112,113,114,115 | 4027 J-K flip flop |

Figure 4:
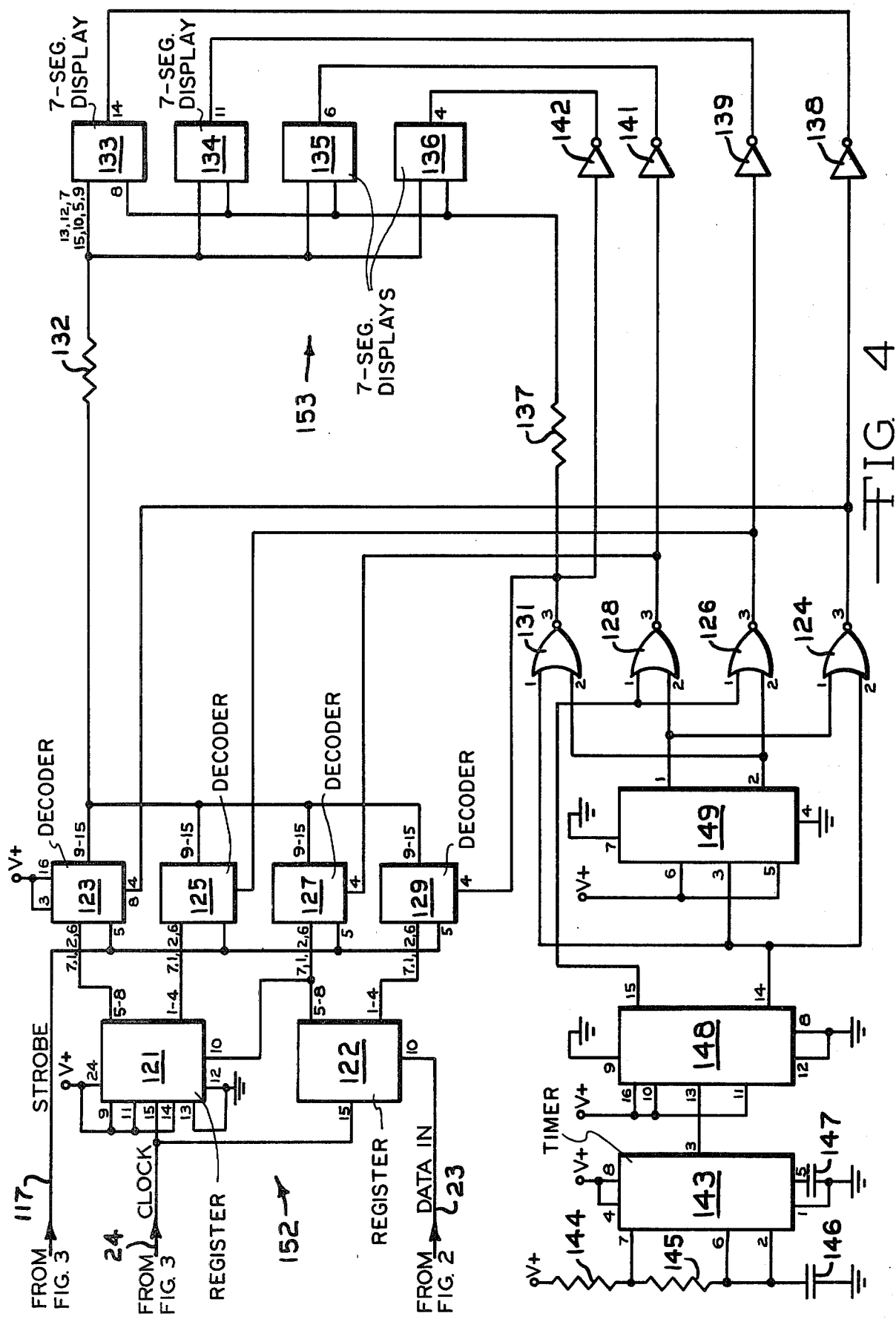
FIG. 4 is a schematic diagram of data collection and display circuitry of the storage unit of FIG. 1.

There is shown in FIG. 4 the data collection and display circuitry of the storage unit 27 of FIG. 1. The clock line 24 is connected to a clock input 121-15 and a clock input 122-15 of a pair of eight stage, bidirectional, parallel/serial, input/output bus registers 121 and 122. The register 121 has a pair of power supply inputs 121-24 and 121-12 connected to the V+ power supply terminal and the circuit ground potential respectively. An A enable input 121-9, an A/B input 121-11 and an A/S input 121-14 are connected to the V+ power supply terminal. A P/S input 121-13 is connected to the circuit ground potential. A serial input 121-10 is connected to a B output 122-8 of the register 122. When connected as shown, the register 121 accepts one bit of serial data at the input 121-10 for each clock pulse received at the clock input 121-15. The register 122 is connected in a similar manner except that the serial input 122-10 is connected to the data line 23. The sixteen clock pulses received on the clock line 24 from the circuit of FIG. 3 clock the sixteen bits of data from the converters 86 and 87 of FIG. 2 into the registers 121 and 122. The sixteen bits of data appear at the B outputs 121-1 through 121-8 and 122-1 through 122-8.

The outputs 121-5 through 121-8 are connected to a plurality of inputs 123-7, 123-1, 123-2 and 123-6 of a BCD-to-seven segment latch/decoder/driver 123. A pair of power supply inputs 123-16 and 123-8 are connected to the V+ power supply terminal and the circuit ground potential respectively. An LT input 123-3 is connected to the V+ power supply terminal, a B1 input 123-4 is connected to an output 124-3 of a NOR 124 and an LE input 123-5 is connected to the strobe line 117. The four input signals are decoded into seven segment driver signals at a plurality of outputs 123-9 through 123-15.

A latch/decoder/driver 125 is connected in a manner similar to the driver 123 with a plurality of inputs 125-7, 125-1, 125-2 and 125-6 connected to the outputs 121-1 through 121-4. A B1 input 125-4 is connected to an output 126-3 of a NOR 126. A latch/decoder/driver 127 is connected in a manner similar to the driver 123 with a plurality of inputs 127-7, 127-1, 127-2 and 127-6 connected to the outputs 122-5 through 122-8. A B1 input 127-4 is connected to an output 128-3 of a NOR 128. A latch/decoder/driver 129 is connected in a manner similar to the driver 123 with a plurality of inputs 129-7, 129-1, 129-2 and 129-6 connected to the outputs 122-1 through 122-4. A B1 input 129-4 is connected to an output 131-3 of a NOR 131. The strobe pulse generated on the line 117, after the sixteen clock pulses, latches the data into the latch/decoder/drivers 123, 125, 127 and 129.

The outputs from the drivers are connected in parallel in a seven line bus. A resistor 132 is representative of seven such resistors, one in each bus line. The bus lines connect the -13, -12, -11, -10, -9, -15 and -14 driver outputs to a plurality of inputs 133-13, 133-12, 133-7, 133-15, 133-10, 133-5, and 133-9 respectively of a thousand's digit of a seven segment display 133. A hundred's digit 134, a ten's digit 135 and a one's digit 136 are similarly connected to the bus lines. A decimal point input 133-8 in front of the thousand's digit is connected to the output 131-3 of the NOR 131 through a resistor 137. A decimal pont input for each of the hundred's, ten's and one's digits is similarly connected. A thousand's backplane input 133- is connected to the NOR output 124-3 through an inverter 138, a hundred's backplane input 134-11 is connected to the NOR output 126-3 through an inverter 139, a ten's backplane input 136-6 is connected to the NOR output 128-3 through an inverter 141, and a one's backplane input 136-4 is connected to the NOR output 131-3 through an inverter 142.

A timer 143 has a pair of power supply inputs 143-8 and 143-1 connected to the V+ power supply terminal and the circuit ground potential respectively. A discharge input 143-7 is connected to the V+ power supply terminal through a resistor 144. A threshold input 143-6 and a trigger input 143-2 are connected to the discharge input 143-7 through a resistor 145 and to the circuit ground potential through a capacitor 146. A control voltage input 143-5 is connected to the circuit ground potential through a capacitor 147. The timer 143 is connected as an astable multivibrator generating a pulse train at an output 143-3.

The output 143-3 is connected to a clock input 148-13 of a J-K flip flop 148. A pair of power supply inputs 148-16 and 148-8 are connected to the V+ power supply terminal and the circuit ground potential respectively. A J input 148-10 and a K input 148-11 are connected to the V+ power supply terminal and a set input 148-9 and a reset input 148-12 are connected to the circuit ground potential. A non-inverting output 148-15 is connected to an input 128-1 and an input 126-1 of the NOR's 128 and 126. An inverting output 148-14 is connected to an input 131-1 and an input 124-2 of the NOR's 131 and 124 and to a clock input 149-3 of a J-K flip flop 149. The flip flop 149 has a J input 149-6 and a K input 149-5 connected to the V+ power supply terminal. A set input 149-7 and a reset input 149-4 are connected to the circuit ground potential. A non-inverting output 149-1 is connected to an input 128-2 and an input 124-1 of the NOR's 128 and 124. An inverting output 149-2 is connected to an input 131-2 and an input 126-2 of the NOR's 131 and 126.

Assuming that the flip flop 148 is generating a "0" at the output 148-15 and a "1" at the output 148-14 and that the flip flop 149 is generating a "1" at the output 149-1 and a "0" at the output 149-2, the NOR 126 will have a "0" at both inputs to generate a "1". The other NOR's will have at least one input at "1" to each generate a "0". When the timer 143 generates a clock pulse, the flip flop 148 will reverse its output signals but the flip flop 149 will remain the same and the NOR 131 will have both inputs at "0" to generate a "1". The other NOR's will have at least one input at "1" to generate a "0". The next clock pulse from the timer 143 causes the flip flop 148 to again reverse its output signals thereby clocking the flip flop 149. The flip flop 149 reverses its output signals and the NOR 128 will have both inputs at "0" to generate a "1". The other NOR's will have at lease one input at "1" to generate a "0". The flip flop 148 responds to the next clock pulse to reverse its output signals and the NOR 124 will have both inputs at "0" to generate a "1". The other NOR's will have at least one input at "1" to generate a "0". The next clock pulse will clock the flip flop 148 which clocks the flip flop 149 and the output signals will be at the initially assumed states.

Thus, the NOR's sequentially generate "1" signals in response to the clock pulses generated by the timer 143 to enable each of the latch/decoder/drivers to generate the display data. The "1" generated by each NOR is inverted to place the corresponding backplane at "0" to enable the segments of the display. The NOR 131 also drives only the decimal point in front of the one's display since only the one's display backplane is at "0" when the NOR 131 generates a "1".

In summary, the clock pulses on the line 24 clock the data bits on the line 23 into the registers 121 and 122. The strobe signal on the line 117 latches the data bits from the registers into the latch/decoder/drivers 123, 125, 127 and 129. The timer 143, the J-K flip flops 148 and 149, and the NOR's 124, 126, 128 and 131 sequentially enable the drivers to place the decoded data on the bus lines and enable the corresponding display digit. The maximum dosage value which can be displayed is 999.9.

| FIG. 4 TABLE OF ELEMENTS | |
|---|---|
| 121,122 | 4034 register |
| 123,125,127,129 | 4511 latch/decoder/driver |
| 124,126,128,131 | 4001 NOR |
| 132,137 | 100 ohms |
| 133,134,135,136 | NSB 7881 four digit display |
| 138,139,141,142 | 75492 inverter |
| 143 | LM555 timer |
| 144,145 | 22 K ohms |
| 146,147 | 0.01 microfarad |
| 148,149 | 4027 J-K flip flop |

Figure 6:
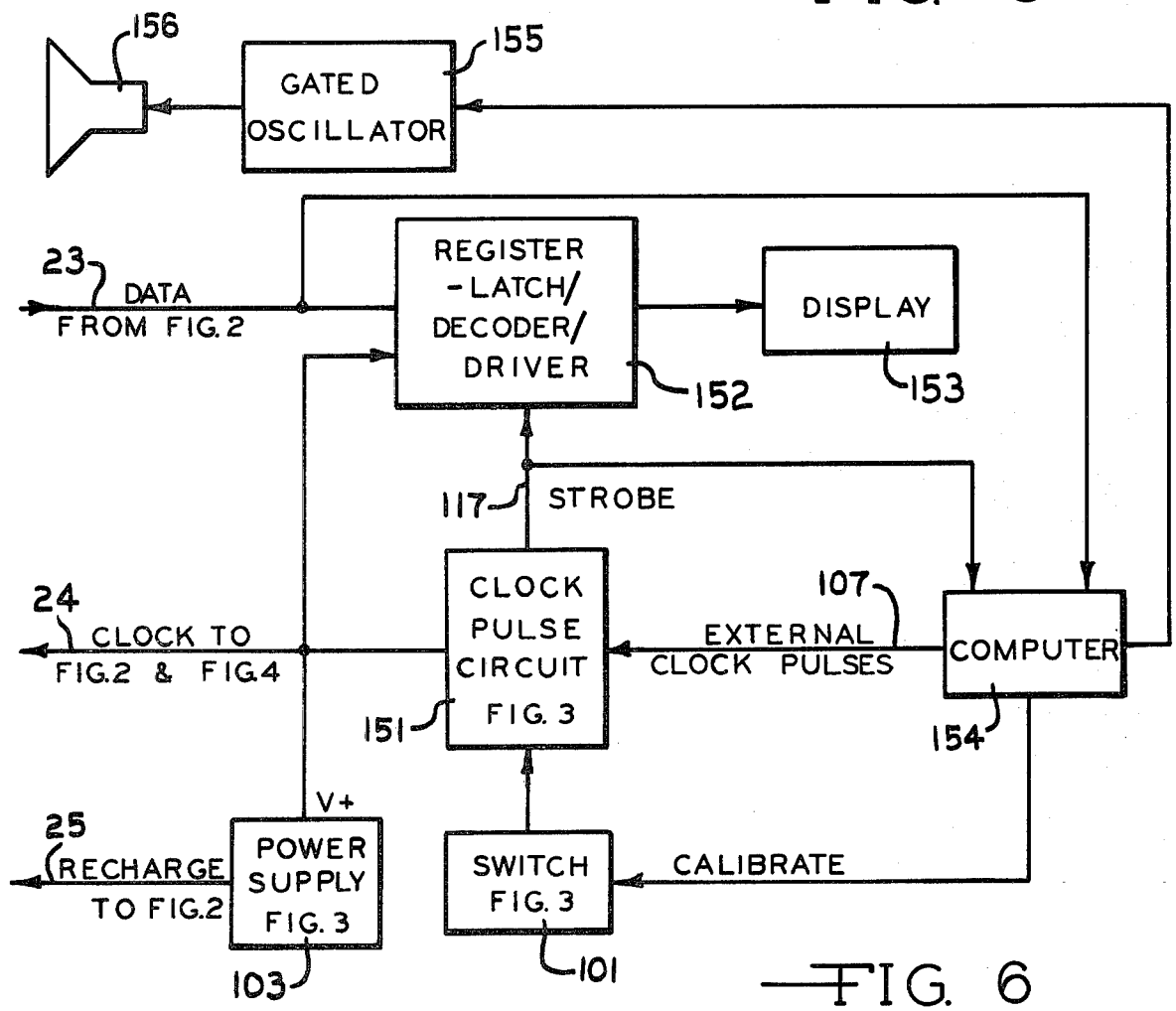
FIG. 6 is a more detailed block diagram of the storage unit of FIG. 1.

There is shown in FIG. 6 a more detailed block diagram of the storage unit 27 of FIG. 1. The data line 23, the clock line 24 and the recharge line 25 can be connected to a pin-type connector (not shown) which mate with the socket-type connector on the hearing protector and noise monitor. When the hearing protector and noise monitor is inserted into the storage unit, the switch 101 is actuated which enables a clock pulse circuit 151 (shown schematically in FIG. 3). The clock pulse circuit generates sixteen clock pulses on the clock line 24. The noise monitor responds to the clock pulses by generating one bit of noise dosage data on the data line 23 for each clock pulse. A register-latch/decoder/driver 152 (shown schematically in FIG. 4) responds to the clock pulses to latch the data for display. The clock pulse circuit 151 generates a strobe pulse on the line 117 after the sixteen clock pulses have been generated to latch the data. The data is then generated to a display 153 (shown schematically in FIG. 4) to visually reproduce the noise dosage count accumulated by the noise monitor circuitry.

After the data has been read, it is desirable to check the calibration of the noise monitor circuit. A computer 154 can be used to generate the external clock pulses on the line 107 to the clock pulse circuit 151. The computer 154 can also be responsive to the strobe signal on the line 117 to actuate a gated oscillator 155. The oscillator 155 drives a speaker 156 to generate noise at one or more predetermined frequencies for a predetermined length of time. The speaker 156 generates the noise to the microphone of the noise monitor circuitry, typically through a flexible hose to eliminate external noise. The computer 154 then can generate a calibrate signal to the switch 101 to recycle the clock pulse circuit 151 and obtain the accumulated count total from the noise monitor circuitry. If the count total is within a predetermined range, the noise monitor circuitry is in calibration. If the noise monitor circuitry is not in calibration, the hearing protector and noise monitor can be removed from service for recalibration.

The computer 154 can also be utilized to collect and store the noise dosage data from one or more of the hearing protector and noise monitors. The data line 23 can be connected to an input of the computer 154 such that the computer reads the data. The computer can store the dosage and the calibration data according to employee number and date. A printer (not shown) can be connected to the computer 154 for printing any of the stored data. The computer 154 can be an LSI-11 computer manufactured by Digital Equipment Corporation of Maynard, Mass. or any similar computer.

In summary, the present invention concerns a hearing protector and noise monitor apparatus which includes means for generating an input signal having a magnitude proportional to the detected noise intensity at the wearer's ear, means responsive to the input signal for generating an output signal having a frequency proportional to the dBA value of the detected noise, and means responsive to the output signal for accumulating a count total proportional to the number of cycles of the output signal representing the noise dosage received by the wearer. The apparatus can include means responsive to the count total for generating an alarm signal when the count total is at a predetermined number representing a maximum noise dosage. The apparatus can also generate a signal having a magnitude proportional to the dBA value of the detected noise intensity and can include a source of a reference signal having a magnitude representing a maximum dBA value noise intensity wherein the alarm means is responsive to the detected noise intensity signal and the reference signal for generating an alarm signal when the magnitude of the detected noise intensity signal exceeds the magnitude of the reference signal. The apparatus can be used in a system with a storage unit which generates a train of clock pulses and receives a noise dosage signal from the noise monitor apparatus. In the noise monitoring apparatus, the means for accumulating a count total can generate an output signal representing the count total and the apparatus can include means responsive to the output signal and the clock pulses for generating the noise dosage signal to the storage unit.

Although the above-described noise monitoring circuits have been discussed in terms of being worn by a worker, some of the circuits could be remotely located and the data transmitted to them. For example, the microphone 31 and the buffer 32 of FIG. 2 could be connected to a radio transmitter worn by the worker for transmitting the signal representing the noise level at the worker's ear. The remainder of the circuitry shown in FIG. 2 could be connected to a radio receiver and to the circuits in the storage unit at a remote location. Alternatively, circuits worn by the worker could be connected to remotely located circuits by an electrical cable. Thus, the present invention is not limited to an embodiment wherein all of the noise monitoring elements are worn by a worker.

In accordance with the provisions of the patent statutes, the principle and mode of operation of the invention have been explained and illustrated in its preferred embodiment. However, it must be understood that the invention can be practiced otherwise than as specifically illustrated and described without departing from its spirit or scope.

What is claimed is:

1. A hearing protector and noise monitor apparatus adapted to be worn in a noisy environment, comprising:
    means for generating an input signal having a magnitude proportional to the detected noise intensity at the wearer's ear;
    means responsive to said input signal for generating an output signal having a frequency proportional to the dBA value of the detected noise, said output signal generating means including means responsive to said input signal for generating a signal representing the absolute value of said input signal, means responsive to said absolute value signal for generating a signal representing the root mean square of said absolute value signal, and means responsive to said root mean square signal for generating said output signal; and
    means responsive to said output signal for accumulating a count total proportional to the number of cycles of said output signal representing the noise dosage received by the wearer and for generating an alarm signal perceptable to the wearer when said count total exceeds a predetermined limit.

2. An apparatus according to claim 1 wherein said input signal generating means includes a microphone located at the ear of the wearer and responsive to the noise intensity for generating said input signal.

3. An apparatus according to claim 1 wherein said output signal responsive means includes a counter means responsive to said output signal for accumulating a count total proportional to the number of cycles of said output signal which have been generated.

4. An apparatus according to claim 3 including a divider means connected between said output signal generating means and said counter means.

5. An apparatus according to claim 1 wherein said input signal responsive means generates a signal having a magnitude proportional to the dBA value of the detected noise and including a source of a reference signal having a magnitude representing a maximum dBA value noise intensity and means responsive to said detected noise dBA value signal and said reference signal for generating an alarm signal when the dBA value of the detected noise exceeds the dBA value of said reference signal.

6. An apparatus according to claim 5 wherein one of said alarm signals is an audio signal.

7. An apparatus according to claim 5 wherein one of said alarm signals is a visual signal.

8. A hearing protector and noise monitor apparatus adapted to be worn in a noisy environment, comprising:
    means for detecting the noise intensity at the wearer's ear and for generating a signal having a magnitude proportional to the dBA value of said detected noise intensity;
    a source of a reference signal having a magnitude representing a maximum dBA value noise intensity; and
    means responsive to said detected noise intensity signal and said reference signal for generating an alarm signal perceptable to the wearer when the magnitude of said detected noise intensity signal exceeds the magnitude of said reference signal.

9. An apparatus according to claim 8 wherein said alarm signal is an audio signal.

10. An apparatus according to claim 8 wherein said alarm signal is a visual signal.

11. An apparatus according to claim 8 including means responsive to said detected noise intensity signal for generating a signal having a frequency proportional to the dBA value of said detected noise intensity and means responsive to said frequency proportional signal for accumulating a count total proportional to the number of cycles of said frequency proportional signal representing the noise dosage received by the wearer and wherein said alarm signal generating means is responsive to said count total for generating an alarm signal when said count total is at a predetermined number representing a maximum noise dosage.

12. A system for monitoring noise including a noise monitor apparatus adapted to be worn in a noisy environment and a storage unit for generating a train of clock pulses and receiving a noise dosage signal from the noise monitor apparatus, the noise monitor apparatus comprising:
    means for detecting the noise intensity at the wearer's ear and for generating a signal having a magnitude proportional to the detected noise intensity;
    means responsive to said detected noise signal for generating a signal having a frequency proportional to the dBA value of the detected noise;
    means responsive to said frequency proportional signal for accumulating a count total proportional to the number of cycles of said frequency proportional signal representing the noise dosage received by the wearer and for generating an output signal representing said count total; and
    means responsive to said output signal and the clock pulses for transferring the noise dosage signal to the storage unit.

13. A system according to claim 12 wherein said output signal generating means generates said output signal as a plurality of binary bits in parallel form and said noise dosage signal transferring means is responsive to the clock pulse train for transferring said binary bits in serial form to the storage unit.

14. A system according to claim 12 including means responsive to the clock pulse train for resetting said output signal generating means.

15. A system according to claim 12 wherein the storage unit includes means responsive to the noise dosage signal for generating a visual display representing the accumulated count total.

* * * * *